(12) United States Patent
Ebelsberger et al.

(10) Patent No.: US 10,468,214 B2
(45) Date of Patent: Nov. 5, 2019

(54) COUPLING ELEMENT FOR AN ELECTRICAL SWITCHING DEVICE

(71) Applicant: Siemens Aktiengesellschaft, Munich (DE)

(72) Inventors: Gerit Ebelsberger, München (DE); Georg Bachmaier, München (DE); Matthias Gerlich, München (DE); Sylvio Kosse, Erlangen (DE); Wolfgang Zöls, München-Lochhausen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/300,415

(22) PCT Filed: Apr. 12, 2017

(86) PCT No.: PCT/EP2017/058739
§ 371 (c)(1),
(2) Date: Nov. 9, 2018

(87) PCT Pub. No.: WO2017/194258
PCT Pub. Date: Nov. 16, 2017

(65) Prior Publication Data
US 2019/0096612 A1 Mar. 28, 2019

(30) Foreign Application Priority Data
May 13, 2016 (DE) .......... 10 2016 208 274

(51) Int. Cl.
*H01H 3/30* (2006.01)
*H01H 3/36* (2006.01)
(Continued)

(52) U.S. Cl.
CPC ............ *H01H 33/666* (2013.01); *H01H 3/30* (2013.01); *H01H 3/36* (2013.01); *H01H 33/40* (2013.01);
(Continued)

(58) Field of Classification Search
CPC .. H01H 3/30; H01H 3/36; H01H 3/38; H01H 3/52; H01H 3/32; H01H 33/666;
(Continued)

(56) References Cited

U.S. PATENT DOCUMENTS 3,636,292 A * 1/1972 Roth ............... H01H 9/541
218/118
4,152,562 A * 5/1979 Kohler ............. H01H 33/666
200/400

(Continued)

FOREIGN PATENT DOCUMENTS

CN 201788887 U 4/2011 ............ H01H 33/66
DE 196 02 912 A1 7/1997 .......... H01H 33/666
(Continued)

OTHER PUBLICATIONS

Reinicke et al., "Rotary-to-Axial Motion Converter for Valve," NASA Tech Brief, Lyndon B. Johnson Space Center, NTIS Tech Notes, Springfield, VA, p. 293, Oct. 1, 1991.
(Continued)

*Primary Examiner* — Truc T Nguyen
*Assistant Examiner* — William A Bolton
(74) *Attorney, Agent, or Firm* — Slayden Grubert Beard PLLC

(57) ABSTRACT

Various embodiments may include a coupling element for an electrical switching device comprising: a first switching contact at a first end of a winding body; a second switching contact; and a rotating body through which the winding body extends. The rotating body rotates on the winding body
(Continued)

and the winding body translates along its longitudinal axis. A cord is arranged on each of the two sides of the rotating body between the rotating body and the winding body so that winding and unwinding of the cord is caused by opposite rotational movements of the rotating body driving a translational movement of the winding body. The rotating body is coupled to two springs so that a spring force always acts on the rotating body in both directions of rotation. A lock blocks the rotating body in at least two extreme positions of the translational movement of the winding body.

7 Claims, 1 Drawing Sheet

(51) Int. Cl.
*H01H 33/40* (2006.01)
*H01H 33/664* (2006.01)
*H01H 33/666* (2006.01)
*F16H 19/06* (2006.01)

(52) U.S. Cl.
CPC ....... *H01H 33/664* (2013.01); *F16H 19/0654* (2013.01); *H01H 2003/3078* (2013.01); *H01H 2205/002* (2013.01)

(58) Field of Classification Search
CPC ................. H01H 33/664; H01H 33/40; H01H 2033/6667; H01H 2003/3078; F16H 19/0654; F16H 19/065; F16H 19/06
USPC ...... 218/140, 153, 154, 78, 84, 92, 120, 118
See application file for complete search history.

(56) References Cited

U.S. PATENT DOCUMENTS

| | | | |
|---|---|---|---|
| 5,151,567 A * | 9/1992 | Thuries | H01H 3/26 200/400 |
| 9,123,480 B2 * | 9/2015 | Einschenk | H01H 3/28 |
| 10,032,581 B2 | 7/2018 | Bachmaier et al. | |
| 2010/0078300 A1 * | 4/2010 | Freundt | H01H 3/30 200/337 |
| 2012/0169441 A1 | 7/2012 | Kim et al. | 335/179 |
| 2014/0260715 A1 | 9/2014 | Smith et al. | 74/25 |
| 2015/0303010 A1 * | 10/2015 | Yu | H01H 33/6644 218/140 |
| 2019/0096612 A1 | 3/2019 | Ebelsberger et al. | |

FOREIGN PATENT DOCUMENTS

| | | | |
|---|---|---|---|
| DE | 10 2006 012 431 A1 | 9/2007 | ............. B25J 18/00 |
| DE | 11 2009 005 331 T5 | 11/2012 | ............. H01H 33/38 |
| WO | 2016/110430 A1 | 7/2016 | ............. H01H 3/36 |
| WO | 2017/194258 A1 | 11/2017 | ............. F16H 19/06 |

OTHER PUBLICATIONS

International Search Report and Written Opinion, Application No. PCT/EP2017/058739, 24 pages, Jul. 18, 2017.

* cited by examiner

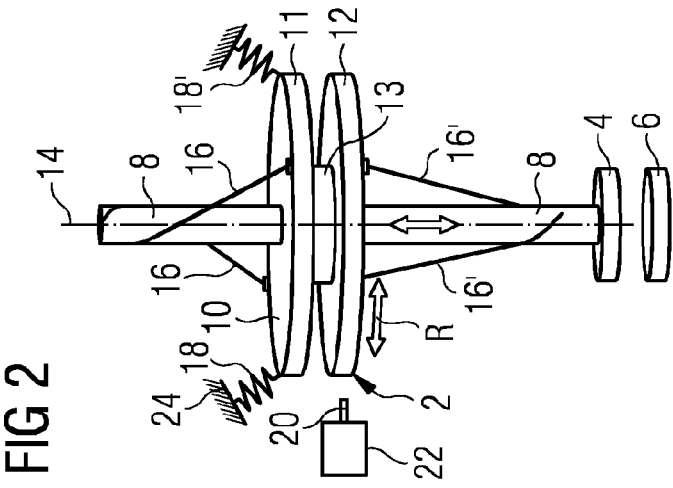
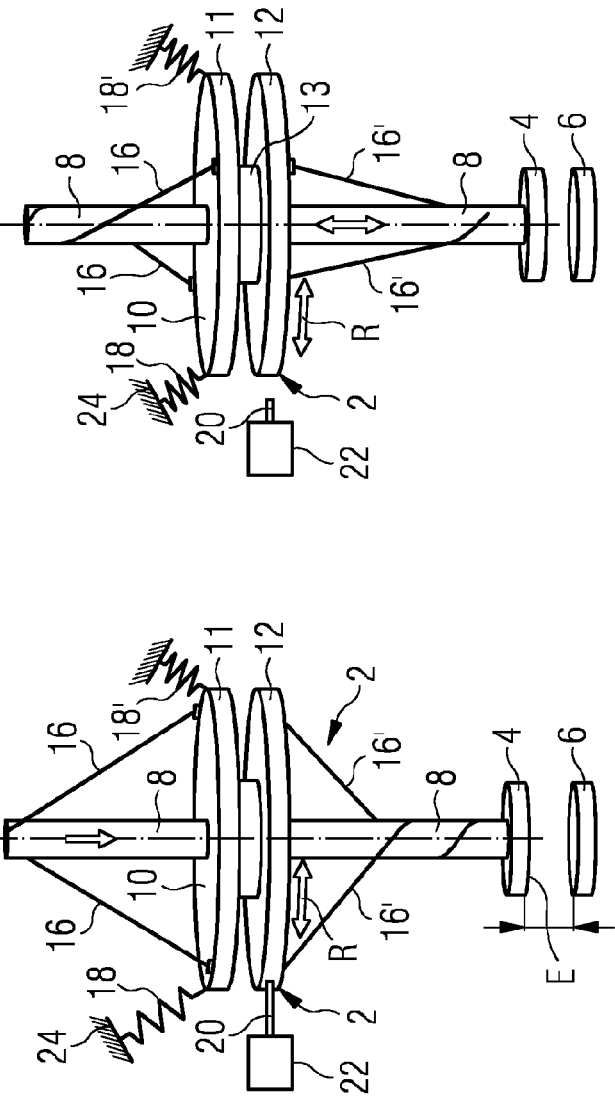

COUPLING ELEMENT FOR AN ELECTRICAL SWITCHING DEVICE

CROSS-REFERENCE TO RELATED APPLICATIONS

This application is a U.S. National Stage Application of International Application No. PCT/EP2017/058739 filed Apr. 12, 2017, which designates the United States of America, and claims priority to DE Application No. 10 2016 208 274.4 filed May 13, 2016, the contents of which are hereby incorporated by reference in their entirety.

TECHNICAL FIELD

The present disclosure relates to electrical devices. Various embodiments may include a coupling element for an electrical switching device.

BACKGROUND

In medium-voltage and high-voltage circuit breakers for AC voltage, the electrical contacts should be capable of opening or closing within a half-cycle and in the process travel a sufficiently large distance in order to build up or reduce the necessary insulating clearance. In addition, the drive unit needs to be capable, during closing of the switchgear assembly, of building up and maintaining a required contact force within the permissible time window. On opening, increased separation force may result from partial welding of the two electrodes or the two switching contacts, which are physically separated and electrically isolated with respect to the switching contacts by the drive unit, which results in relatively high masses and therefore high kinetic energy. During a change in state of the contact, therefore, this in turn results in a high degree of excess energy during closing or opening of the contact, and this excess energy generally needs to be damped in a complex manner in order to avoid so-called contact bounce.

In order to enable safe switching, a substantially higher drive power is generally provided than would in principle be necessary for the switching operation. This in turn results in an excess energy which needs to be compensated for at the end of the switching operation. For this compensation operation, in turn an additional damping element is required.

SUMMARY

The teachings of the present disclosure may be embodied in a coupling element for opening or closing a switching contact for an electrical switching device which, in comparison with the prior art, has a lower requirement for mechanical energy in order to reduce contact bounce. For example, a coupling element for an electrical switching device may comprise a first switching contact (4) for opening and closing an electrical contact having a second switching contact (6). The coupling element (2) comprises a rod-shaped winding body (8), and the first switching contact (4) is arranged at one end of said winding body. The coupling element (2) comprises a rotating body (10), through which the winding body (8) extends, wherein the rotating body (10) comprises two sides (11, 12), of which one side (11) faces one end of the winding body and the other side (12) faces the other end of the winding body, the rotating body (10) is mounted rotatably on the winding body (8), and the winding body (8) is mounted so as to be capable of translational movement along its longitudinal axis (14); at least one cord (16) is arranged on each of the two sides (11, 12) of the rotating body (10) between the rotating body (10) and the winding body (8) in such a way that winding and unwinding of the cord (16) on the winding body (8) takes place by virtue of opposite rotational movements of the rotating body (10), which results in a translational movement of the winding body (8), and the rotating body (10) is coupled to at least two springs (18, 18') in such a way that a spring force always acts on the rotating body (10) in both directions of rotation (R, R'), wherein a lock (20) is provided which locks the rotating body (10) in end positions (E, E') of the translational movement of the winding body (8).

In some embodiments, a freewheel is provided which is coupled to the rotating body (10) and which permits only one direction of rotation of the rotating body (10).

In some embodiments, two freewheels operating in the opposite direction are provided, of which in each case one is activated, and switchover of the activation between the two freewheels takes place in the end positions (E, E') of the winding body.

In some embodiments, release of the lock (20) takes place by means of an actuator (22).

In some embodiments, in the end position (E') in which the contacts (4, 6) are closed, a contact-pressure force of the first contact (4) against the second contact (6) takes place by virtue of the spring force acting on the rotating body (10).

In some embodiments, compensation of energy loss in the coupling element takes place by virtue of mechanical tensioning of the springs (18).

In some embodiments, the at least two springs (18) have a pretension for each positioning of the rotating body (10).

BRIEF DESCRIPTION OF THE DRAWINGS

Further features are described in the following embodiments with reference to the following figures. These are purely exemplary configurations which do not form part of the scope of protection. In the figures:

FIG. 1 shows a coupling element having a rotating body and a winding body and two switching contacts, wherein the two switching contacts are located in an open end position, FIG. 2 shows a corresponding coupling element as shown in FIG. 1 in a mid-position, and FIG. 3 shows a coupling element as shown in FIG. 1 in which the switching contacts are closed.

DETAILED DESCRIPTION

In some embodiments, a coupling element has a first switching contact for opening and closing an electrical contact having a second switching contact. In some embodiments, the coupling element comprises a rod-shaped, elongate winding body, with the first switching contact being arranged at one end of said winding body. In addition, the coupling element comprises a rotating body, through which the winding body extends. In some embodiments, the rotating body comprises two sides, of which one side faces one end of the winding body and the other side faces the other end of the winding body having the switching contact.

In some embodiments, the rotating body is mounted rotatably on the winding body so as to be capable of translational, linear, movement along its longitudinal axis. In some embodiments, at least one cord, which may be in the form of a rope or a wire rope, for example, is arranged on each of the two sides of the rotating body between the rotating body and the winding body in such way that winding and unwinding of the cords on the winding body takes place by virtue of opposite rotational movements of the rotating body, which results in a translational movement of the winding body. In addition, the rotating body is characterized by the fact that at least two springs are coupled in such a way that a spring force always acts on the rotating body in both directions of rotation, wherein a lock is provided which locks the rotating body in end positions of the translational movement of the winding body.

In order to keep the resultant excess energy after a change in state of the coupling element as low as possible, it is helpful to minimize the moving masses and to ensure as smooth a movement profile of the entire coupling element as possible. This applies in particular to the starting phase and to the stop phase of the switching operation. By virtue of the present invention, the masses of the kinematics are reduced by virtue of torsional loading and bending loading being dispensed with and there correspondingly only being compressive and tensile loading. This is achieved in particular by the smooth movement profile, with the result that a resonator, in this case configured in the form of the two springs which are coupled to the rotating body, is realized.

In some embodiments, a freewheel is coupled to the rotating body and permits only one direction of rotation of the rotating body. This freewheel may comprise a corresponding ball bearing, for example, which is only rotatable in one direction, and it is used to ensure that, despite spring forces acting on the rotating body in an end position of the winding body, in principle when a corresponding signal is triggered only one direction of movement of the rotating body and therefore also only one direction of movement of the winding body is possible. In this case, it is additionally expedient that two freewheels are provided, of which in each case one is activated, and switchover of the activation between the two freewheels takes place in the end positions of the winding body. Thus, it is ensured that in each case only one direction of movement of the winding body and therefore the first switching contact is possible.

The lock which locks the rotating body in the position in which an end position of the translational movement of the winding body is present is preferably released by a corresponding actuator. In this case, the actuator can respond to a corresponding signal, for example a control signal, which initiates opening or closing of the switching contact.

In some embodiments, in the end position of the winding body in which the contacts are closed, a contact-pressure force of the first contact against the second contact is exerted by virtue of the spring force acting on the rotating body. In this case, an offset force is applied to the first switching contact, with it being possible for the desired contact force of the electrodes to be determined with the aid of said offset force.

Therefore, in practice small quantities of energy in the resonator system between the springs and the rotating bodies are lost as a result of friction, for example in the springs or the cords, with the result that, after a certain number of opening and closing operations of the coupling element, energy needs to be introduced into the system. This energy is introduced into the system by mechanical tensioning of the springs.

In some embodiments, a coupling element 2, serves the purpose of opening and closing the switching contacts 4, 6 in a vacuum interrupter. Nevertheless, the coupling element also be used in other switching devices for opening and closing an electrical contact.

FIGS. 1 to 3 show a variant of a coupling element 2 incorporating teachings of the present disclosure. By means of the coupling element 2, a contact system consisting of the disk-shaped switching contacts 4 and 6 is actuated, wherein the switching contact 4 is moved relative to the switching contact 6 for this purpose. On contact-making between the two switching contacts 4 and 6, an electrical circuit is closed and a current flow via the electrically conductive rod-shaped winding body 8 (explained further below) and the contact system of the switching contacts 4 and 6 is affected. This current flow can be interrupted again by opening of the contact system by virtue of the two switching contacts 4 and 6 being moved apart from one another.

The switching contact 4 is fastened to a lower end of the winding body 8, which will also be referred to below as the winding bar. The winding body 3 is linearly, i.e. translationally, displaceable, wherein it is guided along its longitudinal axis, but cannot be twisted in the process. A rotating body 10 is mounted rotatably on the winding body 8, i.e. the rotating body can rotate on the winding body. For this purpose, the rotating body 8 has a bore, through which the rod-shaped winding body 8 protrudes. In this case, a bearing 13 is provided between the winding body 8 and the rotating body 10, with the result that the rotation of the rotating body 10 proceeds with as little friction and as few losses as possible.

In some embodiments, the rotating body 8 comprises two disks or sides 11 and 12 which are spaced apart from one another. In this embodiment, the bearing 13 is illustrated schematically between these two sides 11 and 12 of the rotating body, said bearing being intended to illustrate that the rotating body 10 is mounted rotatably on the winding body 8.

FIG. 1 shows a position of the coupling element 2, wherein the contacts 4 and 6 are open when there is as great a distance as possible between them. This distance is denoted by the end position E with respect to the position of the contact 4. FIG. 2 shows a mid-position between the end position E and the end position E' illustrated in FIG. 3, in which the contacts 4 and 6 are closed and a current flow can take place via the contacts.

Beginning with the position of the end position E in FIG. 1, the closing operation of the coupling element 2 will now be described. In this case, it should also be mentioned that the rotating body 10 is coupled to two springs 18 (in this example). The springs 18 are designed for tensile loading and in this case are fastened at one end to the rotating body 10 and fixed at another end to a fixing point 24 outside the coupling element 2. In the end position E, in which a spring 18 has a greater pretension than the spring 18', a lock is provided, which in turn is connected to an actuator 22. In this example, the lock 20 is illustrated very schematically by a rod; the lock 20 may be in the form of two toothed rings engaging in one another, for example, which is not explicitly illustrated here for reasons of better clarity.

In some embodiments, the coupling element comprises cords 16 and 16', which are fastened between the rotating body 10 and the winding body 8, and may be provided with a certain pretension. The cords 16 are in this case each fitted to the winding body 8 and are fastened at a second fastening point as far outwards as possible on the disks 11 and 12 or on the upper and lower sides 11 and 12 of the rotating body 10. In this case, cords are intended to mean overall flexible structures, such as ropes, wire ropes or aramid fibers, for example, which have a high modulus of elasticity on one side in order to achieve as fixed a pretension between the winding body 8 and the rotating body 10 as possible.

In the example shown in FIG. 1, the cords 16' are wound around the winding body through a plurality of revolutions in the lower region between the side 12 of the rotating body 10 and the switching contact 4. In the upper region of the coupling element above the side 11 of the rotating body 10, the cords 16 are not twisted in the position of the end position E shown in FIG. 1. If the lock 20 is opened, for example as a result of a signal which it is passed to the actuator 22, a rotary movement of the rotating body is produced owing to the pretension of the springs 18 and 18', which are overall configured in such a way that a resonator is produced, and, as a result of this rotary movement, the cords 16' unwind in the lower region of the winding body 8 and, conversely, the cords 16 are wound on in the upper region, above the rotating body 10, on the winding body. This position is illustrated in FIG. 2. In the position shown in FIG. 2, the springs 18 and 18' are also present substantially in a position of equilibrium, wherein a pretension of the springs 18 and 18' is present in this case too. This position of equilibrium shown in FIG. 2 is overcome by virtue of the effect of the two springs as resonator and, as shown in FIG. 3, the position of the end position E' in which the two switching contacts 4 and 6 are closed is set.

In some embodiments, the system is configured with respect to the pretensions of the individual springs 18 and 18' in such a way that not only is contact produced between the contacts 4 and 6, but also an offset force, i.e. an additional contact-pressure force, acts on the switching contact 6 owing to the winding body 8 and the switching contact 4. When the end position E' is reached, the lock 20, in turn triggered by the actuator 22, engages in the rotating body 10, with the result that the position of the rotating body 10 is maintained.

In the movement sequence illustrated between FIGS. 1 and 3, it is shown how, owing to the rotation of the rotating body 10, a rotational movement is converted into a translational movement of the winding body 8 and therefore also of the switching contact 4 by virtue of winding of the cords 16. The translational or else linear movement of the winding body 8 can take place in both directions. The closing operation described here can be described in the reverse direction starting from FIG. 3, through the position in FIG. 2, back to FIG. 1, wherein a translational movement of the winding body 8 along its longitudinal axis 14 in the direction of the end position E is completed.

Since the spring pair 18 and 18' acts as resonator, this movement can very often proceed without any considerable friction losses. The friction losses are therefore very low since the friction which is transmitted via the cords 16 and 16' is likewise low and as good positioning of the rotating body with respect to the winding body 8 as possible takes place.

The rotary movement of the rotating body 10 is configured in such a way that the rotating body performs in each case a rotation of approximately 90° in each direction during an opening and a closing operation. In this case, the switching time, i.e. the time which is required by the coupling element to move from the end position E' to the end position E, and vice versa, is dependent on the stiffness of the springs 18 used and the inertia, i.e. the mass of the rotating body 10, which also acts as flywheel. The angular velocity $\Omega$ of the rotating body 10 is in this case directly proportional to the root of the ratio of the spring stiffness, i.e. the spring constant K, and the mass m of the rotating body 10, expressed by way of example by the equation $$\Omega \sim (K/m)^{0.5}.$$

In some embodiments, the energy of the rotating body is set in such way that the desired $\Omega$, i.e. the desired angular velocity, and the desired switching time for the respective switching operation results, wherein approximately 95% of the total energy of the system flows into the switching operation. Owing to the described switching system or coupling element which operates with very low losses, in this case, in an exemplary switching operation, approximately 1.5 J of energy is lost in the system. In a conventional switching operation using a conventional drive, given the same power and a comparable size of the coupling element 20 to 30 times the amount of energy per switching operation is lost. This means that this energy is lost when the two switching contacts 4 and 6 meet, which results in this energy separating the switching contacts from one another and bringing them together again a plurality of times in the microscopic range in a so-called bouncing operation, in a similar way to the way in which a hammer acts as it hits an anvil. This bouncing operation is extremely undesirable during switching of the high-voltage installation since it is not possible for contact to be built up uniformly and quickly as a result of this bouncing operation. By virtue of the coupling element shown in FIGS. 1 to 3 which operates with low energy losses, this bouncing operation is reduced to a minimum.

Since the system of the coupling element 2 switches with such low losses, it is possible to implement a large number of switching operations given a corresponding pretension of the springs 18 and 18'. In this case, the system is preferably set in such a way that as many switching operations can be performed as would generally occur between two maintenance intervals of the switchgear assembly which take place in any case. Thus, with routine maintenance, mechanical tightening, i.e. pretensioning, of the springs 18 and 18' can take place by over-rotation of the rotating body 8 (flywheel). The tightening can take place, for example, manually corresponding to a mechanical clock or with the aid of an electric motor.

Furthermore, two freewheels are also arranged in the region of the bearing 13 (illustrated purely schematically), and the function of the freewheels consists in permitting a rotational movement of the rotating body 10 only in one direction, namely in the direction which is the only desired direction with respect to the respective end position E or E'. These freewheels, which are not explicitly illustrated here, act hand-in-hand with the lock 20, with the result that, when the respective lock 20 is applied, in the end position E, for example, switching only takes place into that freewheel which, owing to the corresponding rotation, permits a translational movement along the axis 14 of the winding body 8 in the direction of the lower end position, i.e. the closed end position E'. In the end position E' shown in FIG. 3, in turn exclusively the rotational movement in the opposite direction and therefore a translational movement upwards in the direction of the end position E is permitted. The freewheel is a ball bearing, which permits only one direction of rotation and blocks the opposite direction of rotation.

What is claimed is:

1. A coupling element for an electrical switching device, the element comprising:
   a first switching contact for opening and closing an electrical contact;
   a second switching contact;
   a rod-shaped winding body with a longitudinal axis, wherein the first switching contact is arranged at one end of said winding body;
   a rotating body through which the winding body extends, the rotating body including two sides with a first side facing one end of the winding body and a second side facing the other end of the winding body;

wherein the rotating body is mounted to rotate on the winding body and the winding body is mounted to translate along the longitudinal axis;

a cord arranged on each of the two sides of the rotating body between the rotating body and the winding body so that winding and unwinding of the cord on the winding body is caused by opposite rotational movements of the rotating body driving a translational movement of the winding body;

two springs coupled to the rotating body so that a spring force always acts on the rotating body in both directions of rotation; and a lock blocking the rotating body in at least two extreme positions of the translational movement of the winding body.

2. The coupling element as claimed in claim 1, further comprising a freewheel coupled to the rotating body which permits only one direction of rotation of the rotating body.

3. The coupling element as claimed in claim 2, further comprising a second freewheel operating in the opposite direction;

wherein as one freewheel is activated, switchover between the two freewheels takes place in the at least two extreme positions of the winding body.

4. The coupling element as claimed in claim 1, further comprising an actuator configured to affect release of the lock.

5. The coupling element as claimed in claim 1, wherein, in an extreme position which closes the contacts, a contact-pressure force of the first contact against the second contact results from a spring force acting on the rotating body.

6. The coupling element as claimed in claim 1, wherein mechanical tension in the springs compensates for energy loss in the coupling element.

7. The coupling element as claimed in claim 1, wherein the two springs are mounted with a respective pretension for each positioning of the rotating body.

* * * * *